3,064,010
PRODUCTION OF SODIUM ISOASCORBATE
MONOHYDRATE
Clarence W. Huffman, Glenview, Ill., assignor to International Minerals & Chemical Corporation, a corporation of New York
No Drawing. Filed Sept. 12, 1960, Ser. No. 55,112
6 Claims. (Cl. 260—343.7)

This invention relates to a process for the production of crystalline sodium isoascorbate monohydrate. In one of its aspects this invention relates to an improved process for producing high purity crystalline sodium isoascorbate monohydrate in high yield. In another of its aspects this invention relates to a process for the crystallization of high purity sodium isoascorbate monohydrate.

Isoascorbic acid and sodium isoascorbate, like their better known analogues, ascorbic acid and sodium ascorbate, are reducing agents which find wide application, especially in the food industry. For example, isoascorbic acid or sodium isoascorbate can be used as an antioxidant in fats and oils, for flour treating, as a dough conditioner in bread baking and for improving the physical appearance of bread, as a stabilizer for beer and ale, for the preservation of natural flavors in milk products, and for preventing browning and development of off-flavors in frozen foods. They are also useful in maintaining the bright red color in fresh meat products. Unlike ascorbic acid, however, isoascorbic acid has very little antiscorbutic value, although it can be used in combination with ascorbic acid to provide a "sparing action" when the latter is used as a vitamin C fortifying agent in foods. Non-food applications of isoascorbic acid and sodium isoascorbate are in color photography and in photographic developing solutions.

Numerous methods have been reported in the literature and in patents for producing isoascorbic acid and sodium isoascorbate. These methods employ different techniques for effecting enolization of various derivatives of 2-keto-D-gluconic acid. For example, Heimann and Reiff, Zentralhalle 93, 97–9 (1954), obtained a 63% yield of isoascorbic acid by adding an equivalent amount of sodium to a solution of methyl 2-keto-D-gluconate in methanol using a nitrogen atmosphere. This mixture was acidified and concentrated to obtain the acid. Pasternack and Regina, U.S. Patent 2,165,151 (1939) prepared isoascorbic acid in yields of 45% by treating methyl 2-keto-D-gluconate with iron filings or powdered manganese, nickel, cobalt, cadmium or zinc. Ohle, Erlbach and Carls, Ber. 67B, 324 (1934) prepared the yellow anhydrous sodium isoascorbate in a yield of 73.5% by heating the methyl 2-keto-D-gluconate with sodium in methanol. They also obtained a 70% yield of the crude sodium isoascorbate by treating methyl 2-keto-D-gluconate with aqueous sodium bicarbonate. Ettel, U.S. Patent 2,590,163 (1952) enolized methyl 2-keto-D-gluconate with a suspension of sodium zincate (Zn(ONa)OH) in methanol. The zinc was removed as the sulfate or sulfide and the resulting filtrate concentrated in vacuo to obtain the free acid in yields of 75–78%. Regna and Caldwell, J. Am. Chem. Soc., 66, 246 (1944) showed that satisfactory conversions of 2-keto-D-gluconic acid to isoascorbic acid could not be achieved with hydrochloric acid as the enolizing reagent. However, purification of the above products to obtain a saleable material suitable for use in foods is tedious, and causes yield losses. In accordance with the present invention, I have provided a process wherein high purity crystalline sodium isoascorbate monohydrate can be produced in high yield without resort to recrystallization of the intermediates or the product.

It is, therefore, an object of the present invention to provide a process for the production of crystalline sodium isoascorbate monohydrate.

Another object of this invention is to provide an improved process for the crystallization of high purity sodium isoascorbate monohydrate.

A further object of this invention is to provide an improved process for producing crystalline sodium isoascorbate monohydrate of high purity in high yield without recrystallization.

Additional objects of this invention will become apparent from the description which follows.

As mentioned hereinabove, the major use for isoascorbic acid and sodium isoascorbate are as additives to and in the treatment of foods and other edible materials. Thus it is essential that the product be pure. Generally, it is desirable that a product marketed for use in foods have a nice white color. Unfortunately, anhydrous sodium isoascorbate has a marked tendency to turn yellow upon exposure to air. However, good quality sodium isoascorbate monohydrate is white and remains white for extended periods. Hence, the monohydrate of sodium isoascorbate is the product sold commercially.

In a major aspect, this invention is concerned with the isolation of a high purity crystalline sodium isoascorbate monohydrate product. In carrying out my process, a methanol solution of anhydrous sodium isoascorbate, preferably hot, is treated with an aqueous solution of an organic acid, which acid is soluble in methanol and is weaker than isoascorbic acid. The mixture is seeded with pure sodium isoascorbate monohydrate crystals and a pure crystalline sodium isoascorbate monohydrate product separates and is collected by filtration or centrifugation. The preferred acid is acetic acid which is both soluble in methanol and weaker than isoascorbic acid. Illustratively, other organic acids meeting these two criteria which can be employed in my process include propionic acid, acrylic acid, and trimethylacetic acid. The quantity of acid employed is dependent, in general, upon the amount of anhydrous sodium isoascorbate in the solution being treated. Enough organic acid is added to provide between about 0.5 and about 4 weight percent of organic acid, basis sodium isoascorbate, preferably about 2.5 to 3.5 weight percent. Although higher quantities can be used, I have found that the use of higher quantities of acid increases the quantity of sodium isoascorbate monohydrate which remains in the mother liquor after removal of the solid product.

The quantity of water employed in the aqueous organic acid solution is such as to provide at least one mole of water for each mole of anhydrous sodium isoascorbate present in the methanol solution being treated. This water, of course, is to provide the water of hydration in the sodium isoascorbate product. In general, between about 1.3 and about 2.5 moles of water per mole of anhydrous sodium isoascorbate can be employed. Best results are obtained using about 2 moles of water per mole of anhydrous sodium isoascorbate. Although higher quantities of water can be employed, these higher quantities are not preferred since they have an adverse effect upon the yield of crystalline sodium isoascorbate monohydrate product. I preferably employ the proper quantity of an aqueous acidic solution containing about 10 weight percent of acetic acid.

I have found that is is necessary to seed the solution from which the sodium isoascorbate monohydrate is crystallized in order to achieve the most desirable product. If seeding is not employed, the sodium isoascorbate monohydrate produced is white but is very fine and powdery in nature. The preferred procedure is to seed the solution during the course of addition of the aqueous acidic mixture at the time when the mixture becomes saturated with respect to sodium isoascorbate monohydrate. During the addition of the aqueous acidic mixture, a small amount of anhydrous material dissolves and it is soon after this point that the seeding is advantageous. This stage in addition can be observed visually and saturation confirmed by adding small quantities of seed crystals until they no longer dissolve. Addition of the seed crystals before saturation by the sodium isoascorbate monohydrate has been reached will result in the dissolution of said seed crystals. Addition of seed crystals after an appreciable quantity of the fine powdery crystals begin to precipitate will be of less effectiveness and result in a product of non-uniform character. It is preferred to add about 3 to about 10 weight percent of sodium isoascorbate monohydrate seed crystals, based on the quantity of sodium isoascorbate monohydrate to be crystallized, although a higher amount can be added to accommodate dissolution if added before saturation occurs.

It is also advantageous in carrying out the process of the present invention to distill a portion of the methanol from the final slurry of the product in methanol. This procedure improves the yield of the crystalline product recovered.

Several techniques are employed to evaluate the quality of the crystalline sodium isoascorbate monohydrate product produced. A primary estimate of quality is a measurement of the percent transmission of 8 percent aqueous solutions in the yellow range, viz., 475 to 600 mu, using a suitable instrument, as for example, a Beckmann B Spectrophotometer. High transmission values show the absence of yellow color or turbidity. Titrations with standard iodine give the purity of the sodium isoascorbate monohydrate. The pH of the 8 percent aqueous solution is also determined. A nearly neutral pH is indicative of the complete neutralization of sodium methoxide employed in converting the ester to the sodium isoascorbate.

The crystallization process described above employs preferably a methanol solution of sodium isoascorbate which has been formed from a methanol solution of good quality methyl 2-keto-D-gluconate as described hereinafter.

As mentioned earlier herein, usual procedures of purification of sodium isoascorbate are quite tedious. They involve repeated recrystallization and yield losses are suffered. In another aspect of the present invention, however, I have found that sodium isoascorbate can be produced in high yield and purity without resort to any recrystallization. In my process, crude methyl 2-keto-D-gluconate is converted almost quantitatively (about 95% and higher) to sodium isoascorbate by the addition of the theoretical quantity, or slightly less, of sodium methoxide to methanol solutions of said gluconate. The crude methyl 2-keto-D-gluconate can be produced by any of the known methods. A preferred procedure, however, is described in the copending U.S. patent application of Oscar L. Norman, Serial No. 12,670, filed March 4, 1960. I have found that the methyl ester must be in solution to achieve the high conversions. The product obtained from the addition of sodium methoxide to a slurry of the methyl ester in methanol (5 ml. per gram) is usually yellow and lumpy. About 24 ml. of methanol is required to dissolve one gram of methyl ester at the temperature preferably employed. Although lower temperatures and higher quantities of methanol can be employed, such conditions do not achieve the most efficient operation of the process.

In my process, a solution in methanol of crude methyl 2-keto-D-gluconate, preferably hot, is subjected to treatment with a decolorizing charcoal to remove organic and inorganic color bodies. The charcoal is allowed to remain in contact with the solution for a period of about 15 minutes, after which the mixture is clarified by filtration, preferably in the presence of a filter aid. I have found that care should be exercised in the selection of the charcoal and filter aid employed to use materials which have a low heavy metal content. Otherwise these metals tend to be retained in the clarified filtrate and cause the sodium isoascorbate produced to have a yellow color. This yellow color manifests itself in the final sodium isoascorbate monohydrate material produced by the crystallization procedure described hereinbefore. A preferred charcoal is sold under the tradename Nuchar C-A by the West Virginia Pulp and Paper Company. A preferred filter aid is sold under the tradename Celite 521 by the Johns-Manville Corporation. It was quite surprising to find that the final sodium isoascorbate monohydrate product produced from a crude methyl ester in accordance with the process of this invention was about as pure and as white as a product produced employing methyl ester which had been purified by recrystallization.

In carrying out my process, the purified solution of methyl 2-keto-D-gluconate in methanol is preferably heated under refluxing or near refluxing conditions and sodium methoxide is slowly added with mixing. The quantity of sodium methoxide employed should not exceed the theoretical or stoichiometric requirement for conversion to sodium isoascorbate, and preferably slightly less than the theoretical quantity is added. Alternatively, since the methyl ester is in a methanol solution, the theoretical quantity of sodium, which will be converted to sodium methoxide in the reaction medium, can be added, although this is a less preferred procedure. In the preparation of the sodium methoxide, care should be taken to use sodium metal which is free of contamination. Thus, dry-packed sodium is preferred to sodium which has been stored under oils or other inert hydrocarbons. The reaction of the methyl ester with sodium methoxide takes place during the addition of the latter, generally over a period of about 15 minutes.

It is the usual procedure in converting methyl 2-keto-D-gluconate to sodium isoascorbate by reaction with sodium methoxide to blanket the reaction medium with nitrogen. I have found that in my process the use of nitrogen is not necessary. The material made without using nitrogen had about the same color and purity as the product made using nitrogen.

After the sodium methoxide has reacted with the methyl ester to produce anhydrous sodium isoascorbate in methanol, crystallization of sodium isoascorbate monohydrate is carried out in the manner described hereinbefore and the product obtained is of high purity and in white crystalline form. Thus, starting with a crude methyl 2-keto-D-gluconate material, a saleable product is produced in high yield without resort to any recrystallization steps.

The following examples are intended to illustrate the underlying principles of the present invention and are not to be construed as unduly limiting thereof.

EXAMPLE I

This example illustrates the preparation of a pure, crystalline sodium isoascorbate monohydrate product starting with a crude methyl 2-keto-D-gluconate which was prepared by the reaction of crude calcium 2-keto-D-gluconate trihydrate with anhydrous hydrogen chloride in methanol.

Sodium methoxide used in this example was prepared by the addition of 500 ml. of methanol (distilled from sodium) to 20 grams of dry-packed sodium (Du Pont) in a flask equipped with a condenser and a drying tube. A small amount of sodium carbonate was removed by filtration of the solution. Normal hydrochloric acid was used to standardize the sodium methoxide solution (1.681 normal).

Twenty-one grams of crude methyl 2-keto-D-gluconate were dissolved in 500 ml. of refluxing methanol (distilled). Two-tenths gram of decolorizing charcoal (Nuchar C-A) was added and then removed by filtration using a sintered-glass funnel coated with a thin layer of filter aid (Celite 521). Thirty ml. of distilled methanol was used to wash the filter cake. The water-white filtrate was refluxed with stirring in a flask equipped with a drying tube. Fifty-eight ml. of the sodium methoxide solution prepared as described hereinabove was added dropwise from a dropping funnel over a period of about 15 minutes. As the last few ml. of sodium methoxide were added, a small amount of anhydrous sodium isoascorbate began to crystallize. The funnel was washed with 10 ml. of methanol after which a dropwise addition was made of an aqueous acidic solution containing 4 ml. of water, 0.5 ml. of glacial acetic acid and 10 ml. of methanol. The 10 ml. of methanol was included only for the purpose of increasing the otherwise small volume of aqueous acidic solution added. Normally, no methanol would be added, except perhaps for washing in the added aqueous acid solution. The precipitated material dissolved during the addition of the acidic solution. At this point reflux was halted momentarily and 1 g. of powdered seed crystals of sodium isoascorbate monohydrate was added. Finally, the remainder of the acidic solution was added slowly. A considerable amount of the product had crystallized by this time.

The condenser was turned for downward distillation and about 350 ml. of methanol was collected, which can be reused. The slurry was cooled to room temperature with stirring. A suction filtration removed the product which was then slurried with 50 ml. of distilled methanol and washed with 10 ml. of distilled methanol.

The air-dried product weighed 20.1 grams, representing 87.6% of theory, taking into account the seed crystals added. An iodine titration showed that the purity of the white granular product ranged from 97 to 99%. The filtrate contained an additional 7% so that the total conversion to sodium isoascorbate was about 95%.

EXAMPLE II

The crystallization procedure of Example I of the sodium isoascorbate monohydrate was repeated without the inclusion of acetic acid. The effect of the use of acetic acid can be seen by the data presented in Table II.

Table II
EFFECT OF ACETIC ACID

|  | Product Without Acid [1] | Product With Acid [1] |
|---|---|---|
| Purity by Iodine Titration | 97.6 | 97.4 |
| pH of 8% Solution | 7.83 | 7.17 |
| Percent Transmission of 8% Solution: |  |  |
| 600 mu | 84.0 | 97.0 |
| 550 mu | 82.0 | 98.5 |
| 500 mu | 79.2 | 98.0 |
| 475 mu | 77.1 | 99.5 |

[1] Absorption cells may not have been matched properly so that transmission values are not exact.

EXAMPLE III

The procedure of Example I was repeated using as a starting material, methyl 2-keto-D-gluconate which had been purified by recrystallization. The results set forth in Table III show that there is very little difference in the yield, purity and color of the products of the resulting sodium isoascorbate monohydrate product.

Table III
RECRYSTALLIZED vs. CRUDE METHYL ESTER

|  | Sodium Isoascorbate Monohydrate from Methyl 2-keto-D-gluconate | |
|---|---|---|
|  | Recrystallized [1] | Crude |
| Yield, percent | 89 | 88 |
| Purity, percent | 98 | 97 |
| Percent Transmission of 8% Solution: |  |  |
| 600 mu | 94.0 | 97.0 |
| 550 mu | 94.2 | 98.5 |
| 500 mu | 99.0 | 98.0 |
| 475 mu | 95.0 | 99.5 |

[1] Absorption cells may not have been matched properly so that transmission values are not exact.

EXAMPLE IV

As pointed out hereinabove, it is conventional to use a nitrogen atmosphere in the conversion of methyl 2-keto-D-gluconate to sodium isoascorbate. In this example, using the procedure set forth in Example I, a comparison was made between products obtained using a nitrogen atmosphere and not using a nitrogen atmosphere. The results are set forth in Table IV.

Table IV
EFFECT OF NITROGEN

|  | Sodium Isoascorbate Monohydrate | |
|---|---|---|
|  | With Nitrogen [1] | Without Nitrogen |
| Purity, percent | 98.0 | 97.5 |
| Percent Transmission of 8% Solution: |  |  |
| 600 mu | 94.0 | 96.0 |
| 550 mu | 94.2 | 95.5 |
| 500 mu | 99.0 | 96.0 |
| 475 mu | 95.0 | 93.1 |

[1] Absorption cells may not have been matched properly so that transmission values are not exact.

While this invention has been described and exemplified in terms of its preferred embodiments, those skilled in the art will appreciate that modifications can be made without departing from the scope of the invention.

I claim:

1. A method for producing a high purity, white crystalline sodium isoascorbate monohydrate having substantial absence of yellow color which comprises adding to a methanol solution of sodium isoascorbate an aqueous solution of an organic acid soluble in methanol and weaker than isoascorbic acid, seeding the mixture with pure sodium isoascorbate monohydrate crystals and recovering a pure, white crystalline sodium isoascorbate monohydrate product having substantial absence of yellow color.

2. A method according to claim 1 wherein said aqueous acid solution is added in quantity to provide about 1.3 to about 2.5 moles of water per mole of sodium isoascorbate present and between about 0.5 and about 4 weight percent, basis sodium isoascorbate present, of organic acid.

3. A method according to claim 2 wherein said acid is acetic acid.

4. A process for the production of high purity, white crystalline sodium isoascorbate monohydrate having substantial absence of yellow color which comprises dissolving methyl 2-keto-D-gluconate in methanol; adding a stoichiometric quantity of sodium methoxide to said solution to produce a solution of sodium isoascorbate in methanol; adding to said methanol solution of sodium isoascorbate an aqueous solution of an organic acid soluble in methanol and weaker than isoascorbic acid; seeding the resulting mixture with pure sodium isoascorbate monohydrate crystals; and recovering a pure, white crystalline sodium isoascorbate monohydrate product having substantial absence of yellow color.

5. A method according to claim 4 wherein said aqueous acid solution is added in quantity to provide about 1.3 to about 2.2 moles of water per mole of sodium isoascorbate present and between about 0.5 and about 4 weight percent, basis sodium isoascorbate present, of organic acid.

6. A method according to claim 5 wherein said organic acid is acetic acid.

References Cited in the file of this patent
UNITED STATES PATENTS
2,517,276    Bassford et al.    Aug. 1, 1950

FOREIGN PATENTS
584,320    Canada    Sept. 29, 1959

OTHER REFERENCES
Ruskin et al.: Science (vol. 108), 1948, pages 713, 714.